(12) United States Patent
Nardone et al.

(10) Patent No.: US 7,716,374 B2
(45) Date of Patent: May 11, 2010

(54) RUN-TIME ENGINE IMPLEMENTED ON A COMPUTING DEVICE ALLOWING SYNCHRONIZATION OF RECORDS DURING APPLICATION EXECUTION

(75) Inventors: Joseph R. Nardone, Arlington, VA (US); Larry D. Mason, Normal, IL (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1105 days.

(21) Appl. No.: 09/977,686

(22) Filed: Oct. 16, 2001

(65) Prior Publication Data

US 2002/0056011 A1 May 9, 2002

Related U.S. Application Data

(60) Provisional application No. 60/240,087, filed on Oct. 16, 2000.

(51) Int. Cl.
*G06F 15/16* (2006.01)
(52) U.S. Cl. .................. 709/248; 709/208; 709/227; 709/229
(58) Field of Classification Search ......... 709/201–203, 709/248, 208, 227, 229; 707/10, 201–204
See application file for complete search history.

(56) References Cited

U.S. PATENT DOCUMENTS

| | | | | |
|---|---|---|---|---|
| 5,319,774 A | * | 6/1994 | Ainsworth et al. | 714/20 |
| 5,684,990 A | | 11/1997 | Boothby | 395/619 |
| 5,845,293 A | * | 12/1998 | Veghte et al. | 707/202 |
| 5,857,201 A | | 1/1999 | Wright, Jr. et al. | 707/104 |
| 5,867,688 A | | 2/1999 | Simmon et al. | 395/500 |
| 5,884,323 A | * | 3/1999 | Hawkins et al. | 707/201 |
| 5,974,238 A | | 10/1999 | Chase, Jr. | 395/200.78 |
| 6,000,000 A | | 12/1999 | Hawkins et al. | 707/201 |
| 6,034,621 A | * | 3/2000 | Kaufman | 340/7.21 |
| 6,044,381 A | | 3/2000 | Boothby et al. | 707/201 |

(Continued)

OTHER PUBLICATIONS

Pendragon Forms 3.0 ; A Technology White Paper ; May 1999 ; pp. 1-9.

(Continued)

*Primary Examiner*—Dohm Chankong
(74) *Attorney, Agent, or Firm*—William H. Bollman

(57) ABSTRACT

A first database implemented on a remote device such as a handheld computer may be reconciled with a corresponding second database implemented on a host computer during execution of an application program on the handheld device. In addition, the application program may be executed according to program instructions stored in an application program file located in the remote device. The databases may be reconciled by first commencing execution of the application program. Then, during the course of program execution, a synchronization instruction located in said application program file is retrieved. The synchronization instruction is executed by establishing a communications link between the handheld computer and the host computer. Subsequently, any differences between the first database and the second database are reconciled. Furthermore, embodiments of the invention contemplate that in addition to reconciling all of the databases located on the handheld and host computers, less than all of the databases may be reconciled to reduce the amount of time required to execute the reconciliation process. In addition, after reconciliation control may be returned to the calling application program, or to another application, as determined by the application designer.

21 Claims, 11 Drawing Sheets

U.S. PATENT DOCUMENTS

| | | | |
|---|---|---|---|
| 6,205,448 B1 * | 3/2001 | Kruglikov et al. | 707/200 |
| 6,247,135 B1 * | 6/2001 | Feague | 707/201 |
| 6,324,544 B1 * | 11/2001 | Alam et al. | 707/201 |
| 6,330,618 B1 | 12/2001 | Hawkins et al. | |
| 6,393,434 B1 | 5/2002 | Huang et al. | |
| 6,442,570 B1 * | 8/2002 | Wu | 709/203 |
| 6,487,560 B1 * | 11/2002 | LaRue et al. | 707/203 |
| 6,553,375 B1 * | 4/2003 | Huang et al. | 707/10 |
| 6,560,655 B1 * | 5/2003 | Grambihler et al. | 709/248 |
| 6,701,521 B1 * | 3/2004 | McLlroy et al. | 717/173 |
| 6,718,425 B1 | 4/2004 | Pajakowski et al. | |
| 2001/0047441 A1 | 11/2001 | Robertson | |
| 2003/0069874 A1 * | 4/2003 | Hertzog et al. | 707/1 |

OTHER PUBLICATIONS

Search Report for corresponding patent application No. PCT/US01/32193.

* cited by examiner

RUN-TIME ENGINE IMPLEMENTED ON A COMPUTING DEVICE ALLOWING SYNCHRONIZATION OF RECORDS DURING APPLICATION EXECUTION

The present application claims priority from U.S. Provisional Application 60/240,087, filed Oct. 16, 2000, entitled "RUN-TIME ENGINE IMPLEMENTED ON A COMPUTER DEVICE ALLOWING SYNCHRONIZATION OF RECORDS DURING APPLICATION EXECUTION", to Nardone et al.

FIELD OF THE INVENTION

The present invention relates generally to run-time engines implemented on computing devices. More particularly, the present invention relates to a run-time engine implementable on handheld computing devices such as personal digital assistants and utilizable for reconciling any or all of a number of databases implemented on a remote device with corresponding databases implemented on a host computing device during execution of an application program.

BACKGROUND OF THE INVENTION

In the last few years, the popularity of small, mobile, handheld remote computing devices, sometimes referred to as palmtop computers or personal digital assistants (PDAs), has grown considerably. Owing to their compact size, these remote devices are easily carried and transported by their users, allowing information to be entered and retrieved from a large number of settings and environments not normally accessible by traditional desktop computing units.

Early generation PDAs offered very limited functionality and were often restricted to serving as personal organizers or datebooks. Indeed, some early models grew out of scientific calculators, and were limited by tiny amounts of memory and equally small text-only LCD screens. Since then, PDAs have become much more powerful with some running versions of operating systems utilized previously only in much larger desktop computers.

While many of these handheld devices were intended to operate as stand alone units, other PDAs were incorporated into larger systems which allowed the free flow of data and information between the PDA and a host computing system or personal computer. In this manner, the PDA and host computing system were provided with the ability to synchronize or reconcile differences between databases implemented on the individual components. For example, applications such as calendar or address books were developed that allowed the implementation of corresponding databases on both the PDA and the host computing system. Each instance of the calendar or address book application was capable of taking new or modifying existing appointments or addresses. Then, the PDAs could be interfaced with the host computing system or personal computer to update changes or entries entered in one database onto the other.

As the versatility and computing power of these PDAs increased, more and more business applications were developed for their use. For instance, later generation PDAs were extremely popular for use as industrial data-gathering devices. As one example, after implementing a warehouse inventory application onto a PDA and host computing system, the PDA could be carried into the warehouse for the collection of inventory data. After finishing the data collection, the PDAs could be interfaced with the desktop units or main computing servers to upload the information into a central location.

However, while these systems were tremendously useful for gathering data from remote environments, the uploading of data typically required an action on the part of the application user. For instance, the user was typically required to physically place the PDA into a cradle attached to, e.g., the host computing system, and press a synchronization button before database reconciliation could commence. If a user failed to remember to commence reconciliation, valuable data could be received late or even lost. Thus, because commencement of the synchronization process was left to the application user, the uploading of data to a central database location often did not meet the time constraints imposed by the application designers.

Furthermore, conventional synchronization processes generally reconciled all of the databases implemented in the PDA and host computing system. For example, with each synchronization operation all of the updated information in a calendar database, an address book application, any newly generated memos, a "To-Do List", as well as a warehouse inventory application were reconciled. Needless to say, this process was unduly burdensome and rather inefficient in situations where the only information desired consisted of the newly updated data gathered by the warehouse application.

Thus, it can be seen that conventional reconciliation processes are particularly inefficient in today's fast-paced business environment. Consequently, what is needed is a reconciliation technique that allows an application program to initiate the synchronization process. Similarly, what would also be useful is a reconciliation technique that allows the reconciliation of a selected group of databases implemented in the PDAs and host computing systems.

SUMMARY OF THE INVENTION

The present invention addresses the above problems by providing a reconciliation process which allows synchronization of at least one database of a plurality of databases implemented on a handheld computer with at least one database of a plurality of databases implemented on a host computer during execution of an application program on said handheld device. Thus, an application designer may determine when synchronization is to occur by writing synchronization commands into the application program code. In this manner, the integrity of the data is not dependant upon the application user. In addition, the present invention also allows the reconciliation of less than all of the databases implemented on the handheld and host computers. By doing so, a substantial time savings may be realized. At least for certain envisioned aspects, embodiments of the present invention contemplate that communication between the handheld device and host computer is of a wireless variety, thus allowing the synchronization to occur without the need to place the handheld device in a cradle.

In particular, embodiments of the present invention contemplate that a first database implemented on a remote device such as a handheld computer may be reconciled with a corresponding second database implemented on a host computer during execution of an application program on the handheld device. The application program may be executed according to program instructions stored in an application program file located in the remote device. The databases may be reconciled by, e.g., first commencing execution of the application program and/or during the course of program execution. In either situation, a synchronization instruction located in said application program file is retrieved for the purpose. In executing the synchronization instruction, a communications link is established between the handheld computer and the host computer. Subsequently, any differences between the first database and the second database are reconciled. Furthermore, embodiments of the invention contemplate that, in addition to reconciling all of the databases located on the handheld and host computers, less than all of the databases may be reconciled to reduce the amount of time required to execute the reconciliation process. In addition, after reconciliation has occurred, control may be returned to the calling application program, or to another application, as determined by the application designer.

BRIEF DESCRIPTION OF THE DRAWINGS

Various objects, features, and advantages of the present invention can be more fully appreciated as the same become better understood with reference to the following detailed description of the present invention when considered in connection with the accompanying drawings, in which.

DETAILED DESCRIPTION OF THE INVENTION

Figure 1A:
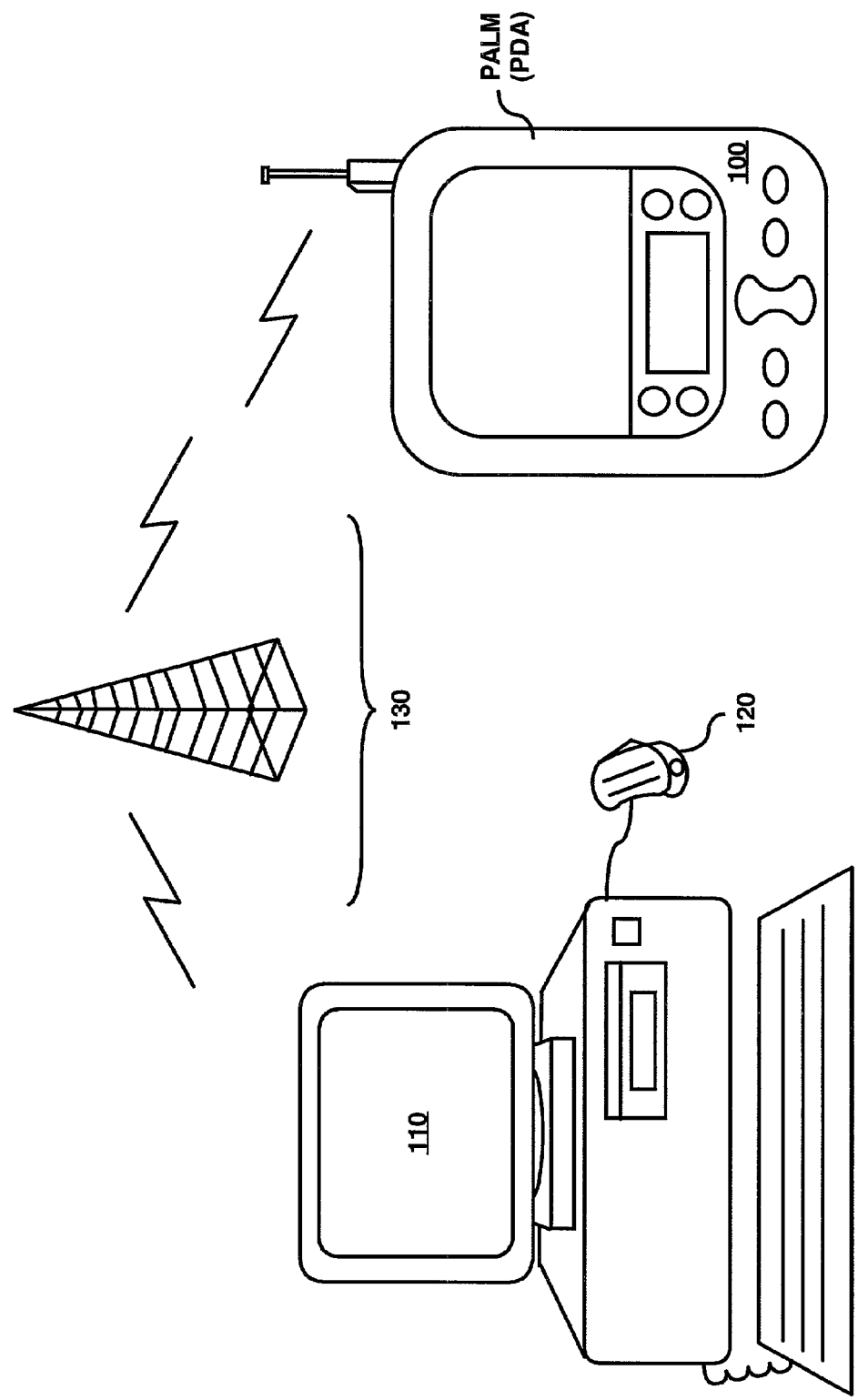
FIG. 1A illustrates a number of computing components capable of implementing a run-time engine of the present invention.

Referring to FIG. 1A, a remote device or computer, for example, a portable computer or personal digital assistant (PDA) 100, is utilized in conjunction with a host server (PC) 110, which may include, for example, a desktop or personal computer, to implement a number of aspects of the present invention. Examples of PDA 100 may include any of a number of handheld devices such as those offered by Palm, Inc. of Santa Clara, Calif., including, for example, Palm VII™ devices. Examples of PC 110, on the other hand, include any of a number of different types of computers, such as those having Pentium™-based processors as manufactured by Intel Corporation of Santa Clara, Calif.

In the example of FIG. 1A, PDA 100 interfaces with PC 110 via cradle 120 to facilitate the transmission of data therebetween. In this regard, cradle 120 may be connected to PC 110 by a communications link, such as a direct cable connected to a serial port located in PC 110, or the like. In addition, communication between PDA 100 and PC 110 may also occur remotely via one or more wireless networks 130 including, for example, wireless LANs/WANs, the Internet, intranets, or the like. In this manner, application programs as well as information or data stored in database tables and the like may be communicated between PDA 100 and PC 110.

Figure 1B:
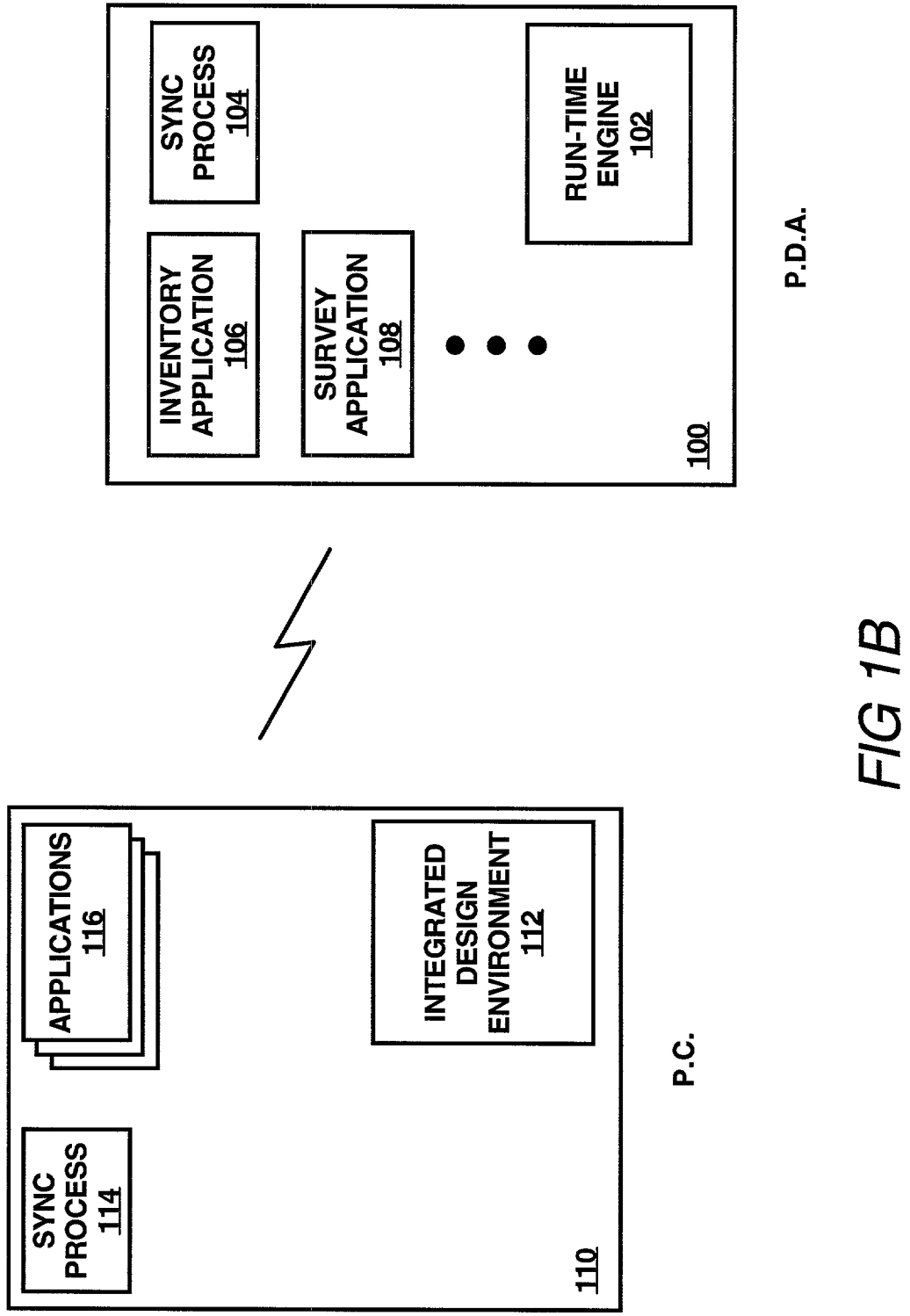
FIG. 1B is a block diagram representation of the various computing processes of the components of FIG. 1A utilizable for implementing and for use with the run-time engine of the present invention.

Referring to FIG. 1B, one example of a number of computing processes and components utilizable for implementing aspects of the present invention is illustrated. As will be discussed below, embodiments of the present invention contemplate that PC 110 may be utilized to design and build any number of application programs 116 which may then be transmitted to PDA 100 for implementation and execution therein. More particularly, design of the application programs typical occurs through use of an integrated design environment (IDE) 112, after which the application program may be stored or packaged into application program files. In turn, the application program files may be transmitted to PDA 100, where the application programs may be executed using a run-time engine 102.

IDE 112 functions generally as a developmental tool for designing and building application programs 116 to be executed on PDA 100. For instance, an application designer may utilize IDE 112 to, for example, design any of the screens that may appear on PDA 100, define forms to be displayed, and indicate the source of data for each entry in the form. Similarly, the designer may also dictate or determine the behavior of an application program. For instance, the designer may generate or input the code or instructions that control the processing of each application program. As one example, the designer may wish to associate a button displayed on a screen with a name capture process. Thus, the designer may first draw or design the screen that contains the button for launching the name capture process. Subsequently, the designer may write the code that executes after the button is pushed or tapped by an application user. Then, during execution of the application, any taps to that button launch the code written by the designer for reading stylus inputs or keystrokes. In addition to allowing the manual generation of code by an application designer (e.g., by typing instructions one-by-one on a keyboard), embodiments of the present invention contemplate that IDE 112 also provides a visual or menu driven code generation environment that allows a designer to select an action from a list of possible actions written or described in plain English.

In response to the designer's selection, the actual command or instruction is provided to the designer for association with a form or button. As such, a designer need not memorize each command or instruction. Instead, the designer may utilize this menu driven code generation feature to assist in selecting the actual code to be implemented. For example, at some point during execution of the application program, a designer may wish to jump from one form to a second after tapping a button. To generate this code, the designer may manually type a "NextScreen" command along with one or more operands. In the alternative, using the above menu driven code generation feature, the designer may select the action "Jump to a form" listed in a pull-down menu. In response, IDE 112 provides the actual instruction "NextScreen", which may then be associated with the button by the designer.

Embodiments of the present invention also contemplate the provision of a synchronization command or instruction which may be incorporated by a designer at any point into an application program. In particular, the synchronization command allows an application program to initiate reconciliation between one or more databases implemented on PDA 100 and PC 110. In a first example, a synchronization command without parameters reconciles all of the databases implemented on PDA 100 with corresponding databases implemented on PC 110. For instance, on a PDA having an address book database and a calendar database, execution of the synchronization command without parameters reconciles any differences between the address book and calendar databases implemented on PDA 100 and the corresponding databases implemented on PC 110.

In addition, the synchronization command may also be written and executed with one or more parameters. For instance, the designer may include one or more specific databases as parameters. As a result, only those databases included as parameters would be reconciled. Thus, using the example discussed above, execution of this command with the address book database as a parameter reconciles only the address book databases. In this manner, by not having to reconcile all of the databases implemented on PDA 100 and PC 110, a tremendous time savings may be realized. In addition, other parameters may also be included. For example, a designer may determine where control of processing is to be passed after completion of the synchronization command. To do so, the designer includes one or more application programs, with or without databases to be reconciled, as a parameter with the synchronization command. By doing so, after reconciliation, control may be returned to the calling application program or to some other application altogether. Thus, the designer may indicate that control is to return to the calling process after reconciliation. Similarly, the designer may indicate that control is to be delivered to another application program after reconciliation, including, for instance an application launch screen.

In accordance with the principles of the present invention, the execution of these synchronization instructions calls a synchronization program or sync process 104 located on PDA 100. In response, sync process 104 calls a synchronization program or sync process 114 located on PC 110. Sync processes 104 and 114 may include any of a number of communications processes including, for example, ScoutSync™ Version 3.5 offered by Aether Systems, Inc. of Owings Mills, Md. Sync processes 104 and 114 then facilitate communication between PDA 100 and PC 110 using any of a number of transfer mechanisms including, for example, Hotsync™ offered by 3Com Corporation. Other transfer mechanisms may also be utilized including TCP/IP and the like. Whatever the case, sync processes 104 and 114 facilitate the transfer of a variety of data and information between PDA 100 and PC 110. As one example, the application programs designed in PC 110 may be downloaded for execution onto PDA 100. Likewise, sync processes 104 and 114 also allow databases located in PDA 100 to be reconciled with corresponding databases located in PC 110, or vice versa. In wireless environments, embodiments of the present invention contemplate that reconciliation of the databases occurs without any action on the part of the user. Indeed, this procedure may take place without the user knowing that reconciliation has occurred. In environments where cradle 120 must be utilized to interface PDA 100 with PC 110, a message may be displayed on PDA 100 directing the application user to place PDA 100 into cradle 120, and to then tap button displayed in PDA 100. In this case, the actual data transfer would occur after the button has been tapped.

Referring back to FIG. 1B, as mentioned above, any of application programs 116 may be transmitted in an application program file to PDA 100 via sync processes 104 and 114. In particular, after designing and building an application, the application and/or any related information may be stored or packaged in an application program file and transmitted from PC 110 to PDA 100. More specifically, the application program file generally includes any application pseudocode, forms or table information, screen and menu definitions, and/or any other related application information. In this example, the application pseudocode includes any code or instructions entered by the application designer during the design phase of the application. For instance, application pseudocode may include the instructions or details utilized to implement the application on PDA 100, as embodied in source code, object code, a form of compiled code, or any combination thereof.

After transmission, each of application programs 116 may appear as an executable file (e.g., applications 106 and 108) on PDA 100. To execute one of these application programs, an icon representing the application, for example, may be tapped. In response, the selected application program locates and calls run-time engine 102, which in turn assumes responsibility for executing the application. More specifically, after an application program is launched, run-time engine 102 retrieves and executes the instructions and information stored in the application program file. In addition to these instructions, run-time engine 102 also utilizes information such as screen definitions, menu definitions, and other program scripts to implement the logic of the application. Furthermore, much of the code that actually runs the application may be implemented in run-time engine 102. To take an add command for inserting a record into a database as an example, the add instruction may appear as a simple one line command in the application program file. However, execution of the command may require hundreds of run-time instructions. Thus, in this example, run-time engine 102 contains the code used to implement the details involved in actually referencing the database to add a record. As a result, only a small amount of custom code need be generated by the designer and included with the application program file.

Figure 2:
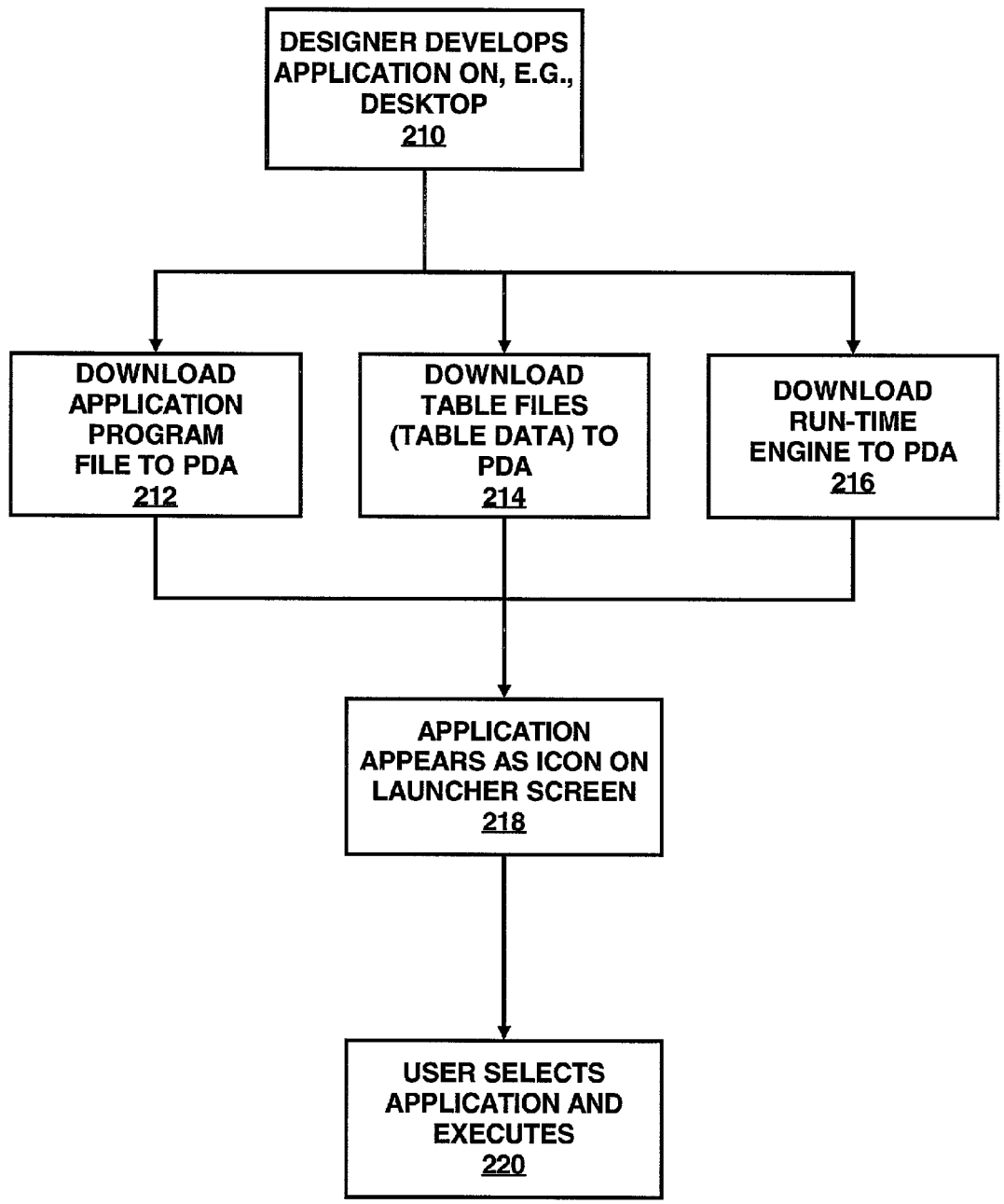
FIG. 2 depicts one example of a process utilizable for designing and preparing an application for execution by the run-time engine of the present invention.

Referring to FIG. 2, one example of a process utilizable for preparing an application for execution on PDA 100 is now described. Using IDE 112 implemented on PC 110, a user or application designer initially designs an application utilizing, for example, a high-level programming language (step 210). As contemplated by embodiments of the present invention, the application may be designed so that it utilizes one or more databases or tables which may be associated with corresponding databases implemented in PC 110. As such, it is envisioned that during execution of the application program, these databases may require reconciliation or synchronization. Thus, in addition to including information relating to the application structure, format, and algorithms for controlling the application, the designer may also input information relating to the database tables. With respect to this table data, the designer may include the number of fields in each record, the type of data that may be stored in the individual fields, and any actual data records. Subsequently, this table and application data are stored to one or more application program files.

After the application and/or any related information are stored or packaged into an application program file and/or one or more table files, the application and/or table files may be transmitted from PC 110 to PDA 100 (steps 212 and 214). As discussed above, the application program file may include application pseudocode, screen and menu definitions, and/or any other related application information. In addition, the table file generally includes any table data such as table metadata (i.e., the characteristics of the table including the number of fields and field type) and any actual data records. Furthermore, if PDA 100 does not already have a copy of runtime engine 102, a run-time engine process may now be loaded onto PDA 100 to facilitate the execution of any application programs (step 216). Subsequently, upon receipt of the application program and/or table files, the application program may appear as an executable file on PDA 100. For example, the application program may appear as a program icon on the screen of PDA 100 (step 218). Then, to run or execute the application program, the user taps on the corresponding screen icon (step 220).

Turning to FIGS. 3A-3D, one example of a control process utilizable by run-time engine 102 for executing an application program is described. Initially, as mentioned above, an application program is selected for execution by a user (step 302). In response, the application program commences processing (step 304), and, in turn, locates and executes run-time engine 102 (step 306). Subsequently, control of the process is transferred to run-time engine 102 (step 308). From there, run-time engine 102 performs a majority of the logic and inspects the application program file only when information is needed. For example, while run-time engine 102 may be able to process the routine functions of the application program, it may need to refer to the application program file in order to display a particular screen or form.

After it receives control of the process (step 308), run-time engine 102 initializes the application for execution (step 310) by reading the application program file to determine whether any project startup code exists (step 312). This project startup code may include instructions for preparing or initializing a device for use with the application. As an example, an application may require the use of a scanner for the collection of data. Thus, with this example, the startup code may instruct PDA 100 to have the scanner turned on. Consequently, if project startup code exists, it may be executed at this time (step 314). On the other hand, if no project startup code exists, or after any existing project startup code has been executed, run-time engine 102 directs PDA 100 to display a first form or screen (step 316).

From there, the process enters an event loop and commences processing by waiting for the completion of an event (step 318). In addition, it is envisioned that any of a number of events may result in or cause the execution of one or more program instructions by run-time engine 102. Thus, embodiments of the present invention contemplate that any number of these events may cause the retrieval and subsequent execution of, for example, the synchronization command or the synchronization command with parameters. Several examples of these events are discussed below.

A first example of an event includes the selection of a screen object by the application user (step 320). This particular event may be effected by, for instance, tapping or selecting a button or icon displayed by PDA 100. Similarly, the user could select a pull-down menu or the like. Whatever the case, after selecting the screen object, run-time engine 102 checks the application program file for the existence of tap code associated with the selected object (step 322). If tap code exists, the instructions or code are executed (step 324). One example of this tap code includes a process for switching to a different screen or for launching another application or subroutine. Likewise, the tap code could also include a synchronization command resulting in the reconciliation of PC 110 and PDA 100 databases. In any event, after the tap code has been executed processing returns to step 318 and awaits another event completion. Still referring to FIG. 3B, another possible event includes leaving an edit field (step 326). Here, the user has entered or edited information in a record and signals that editing is finished by exiting the edit field. In response to the completion of this editing event, run-time engine 102 checks the application program file for the existence of any validation code associated with the edit field (step 328). This validation code allows the application program to verify that the entered or edited data complies with any application program requirements. For example, the validation code may check or confirm that no numbers were entered into a character string field, such as a name field. Furthermore, as part of the validation code routine, it may be possible to update or reconcile any entered or edited data using the synchronization commands described above. Thus, if validation code exists, the instructions or code are executed (step 330). If no validation code exists, or after any existing validation code has been executed, processing returns to step 318 and awaits another event completion.

An event completion, may also include the selection of a menu item (step 332). In particular, a menu may have been displayed in response to, for example, the selection of a menu object. The selection of one item in the menu then results in the execution of that item (step 334). The item may include a processing routine, a synchronization command, or another application, and the like. Then after execution of the item, processing returns to step 318 for another event completion.

Figure 3A:
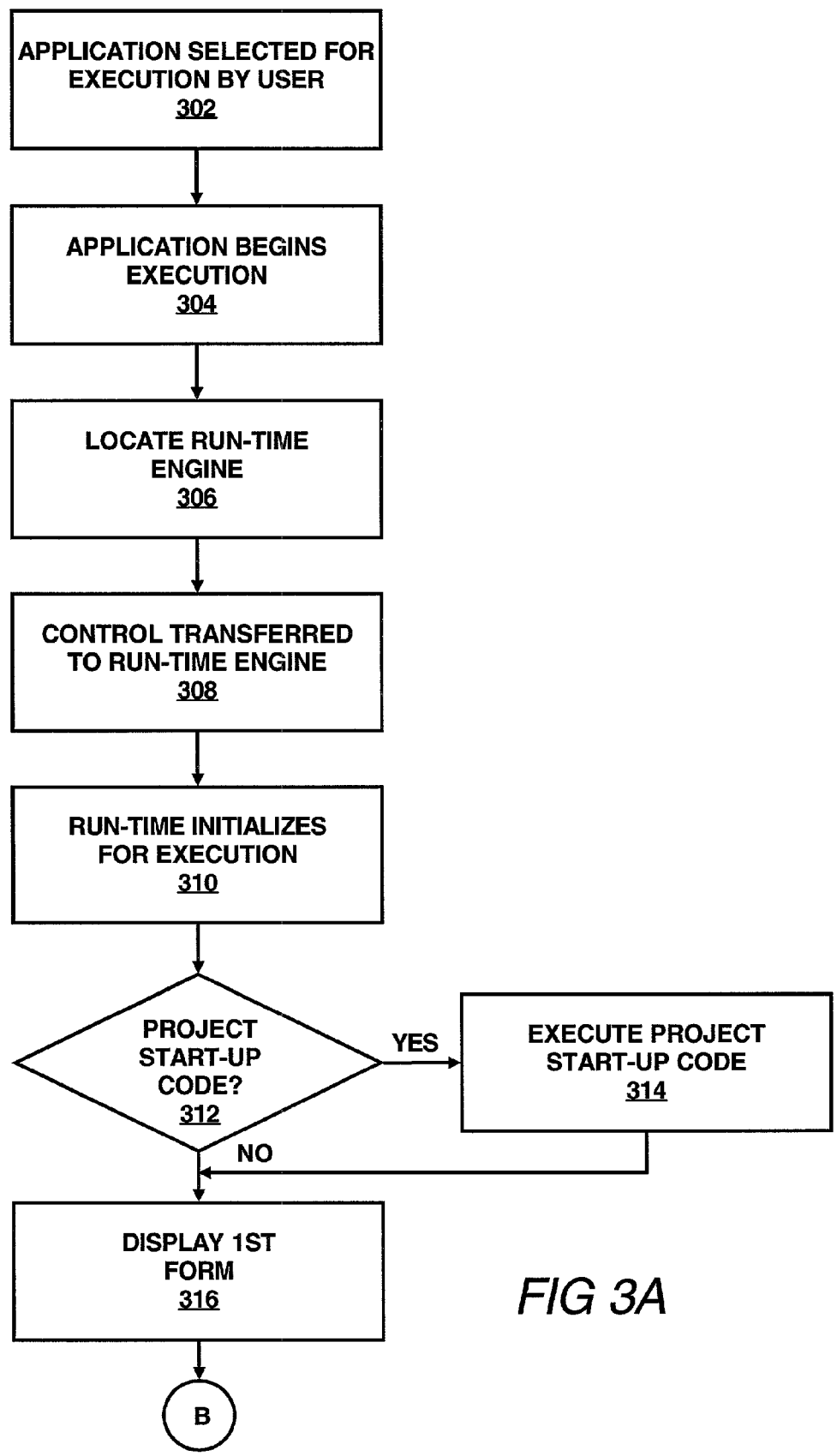
FIGS. 3A-3D depicts one example of a control process utilizable by the run-time engine of the present invention for executing an application program.
Figure 3B:
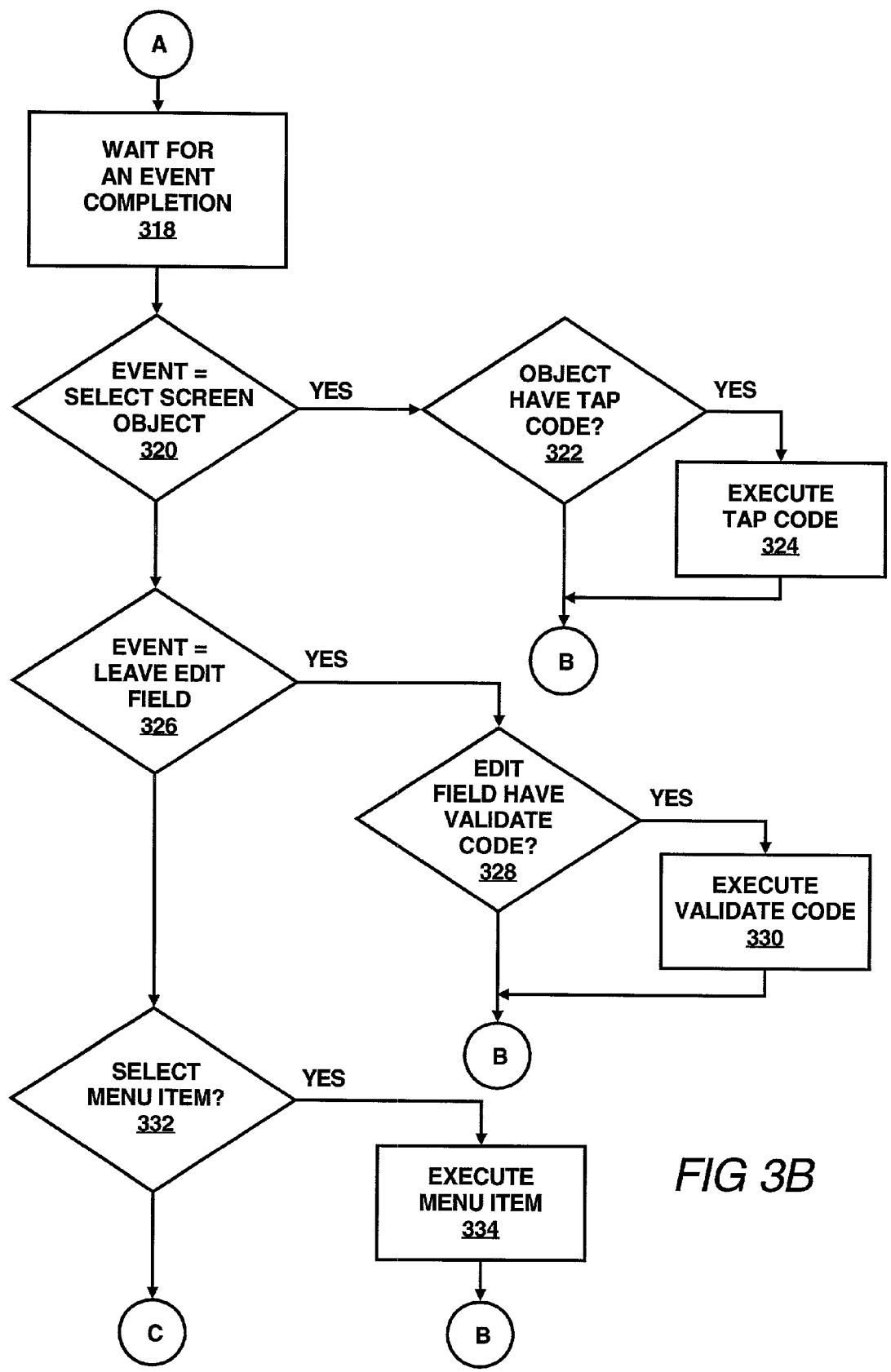
Figure 3C:
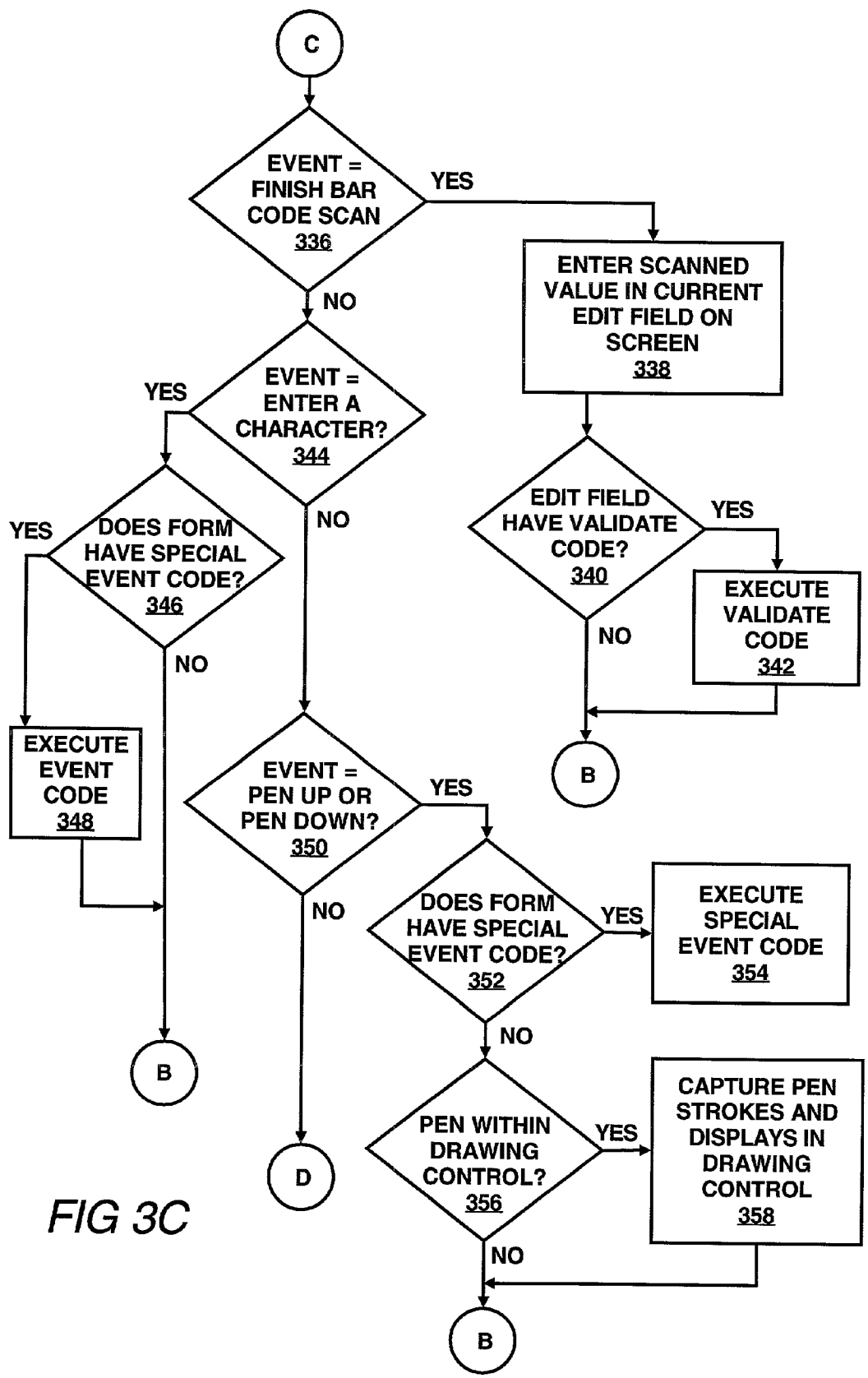

Turning now to FIG. 3C, event completions may also involve peripheral devices other than the PDA 100 screen. For instance, the completion of a bar code scan may constitute an event completion (step 336). In this case, after scanning a piece of information or data, the scanned value may be entered or added to a current edit field in PDA 100 (step 338). Hence, during the execution of, for example, a warehouse inventory application, a user may be able to scan an identification bar code printed on a piece of warehouse inventory, such as a box of soap, resulting in the addition of the box of soap's ID number into a database table. Subsequent to entering the scanned value into the edit field, run-time engine 102 checks the application program file to see whether any validation code associated with the edit field exists (step 340). Like the example described above, the validation code may be used to verify that the scanned or entered data complies with application requirements. For example, it may be possible to confirm that only ID numbers relating to soap are entered into soap fields. If validation code exists, the instructions or code are executed (step 342). After any validation code has been executed, including, for example, any synchronization commands, processing returns to step 318 and awaits another event completion.

Other possible events depicted in FIG. 3C include special events such as entering a character or pen up and pen down events. Entering a character into PDA 100 (step 344) allows a user to enter text during execution of an application. For instance, a survey form could require that the user enter a name or address. Like the above examples, any number of special event codes can be associated with one or more characters during the design of the application. Therefore, after a character is entered, run-time engine 102 checks for the existence of special event code in, for example, the application program file (step 346). If such code exists, it may then be executed (step 348).

Pen up and pen down movements may also constitute events (step 350), and like the character event mentioned above can also be associated with special event code. Consequently, upon reading a pen up or pen down event, run-time engine 102 reads or checks, for example, the application program file for special event code associated with the pen up or pen down event (step 352). If special event code is located, the instructions are executed (step 354). On the other hand, if no special event code is located, or if code is located and executed, run-time engine 102 verifies that the pen event occurred within drawing control (step 356). If so, the pen strokes are captured and displayed in the drawing control of PDA 100 (step 358). Afterwards, processing returns to step 318 for another event completion. Like the above examples, any of the special event codes may include one or more synchronization commands and the like.

Figure 3D:
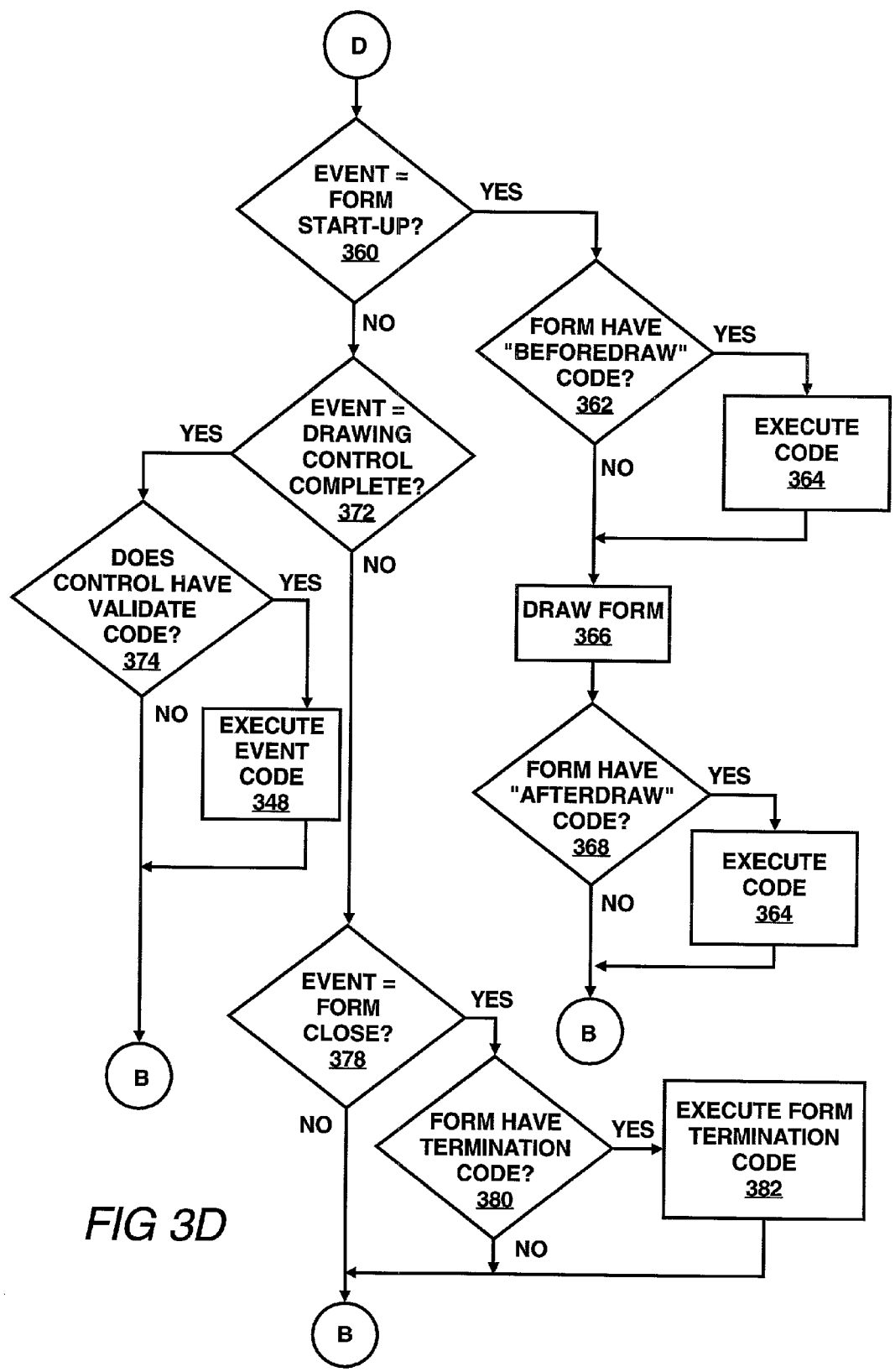

Turning now to FIG. 3D, another example of an event completion includes a form start-up event (step 360). After reading or detecting this event, run-time engine 102 checks, for example, the application program file for any "beforedraw" code associated with the form (step 362). This code may facilitate, for example, actions to be taken before the form is displayed, including one or more database synchronization commands. Accordingly, any "beforedraw" code located by run-time engine 102 may be executed prior to displaying the form (step 364). After execution of any "beforedraw" code, the selected form may be displayed on PDA 100 (step 366). Subsequently, run-time engine 102 checks, for example, the application program file for any "afterdraw" code associated with the form (step 368). As with the "beforedraw" code, any "afterdraw" code, including any synchronization commands, may be executed (step 370) before returning to step 318.

Yet another example of an event completion includes an event indicating that drawing control is complete (step 372). This event could include, for example, tapping a particular button, or selecting an option from a menu. Whatever the case, run-time engine 102 then checks the application program file to see whether any validation code has been scripted with this event (step 374). If so, the validation code is executed, including any synchronization commands (step 376). Then, processing returns to step 318 and awaits another event completion.

Still yet another event completion includes an event to close a particular form (step 378). Like the above events, after a form is closed, run-time engine 102 checks the application program file to see whether any code, in this case termination code, has been scripted (step 378). If so, the termination code is executed, including any synchronization commands (step 380), and processing returns to step 318 for another event completion.

Figure 4:
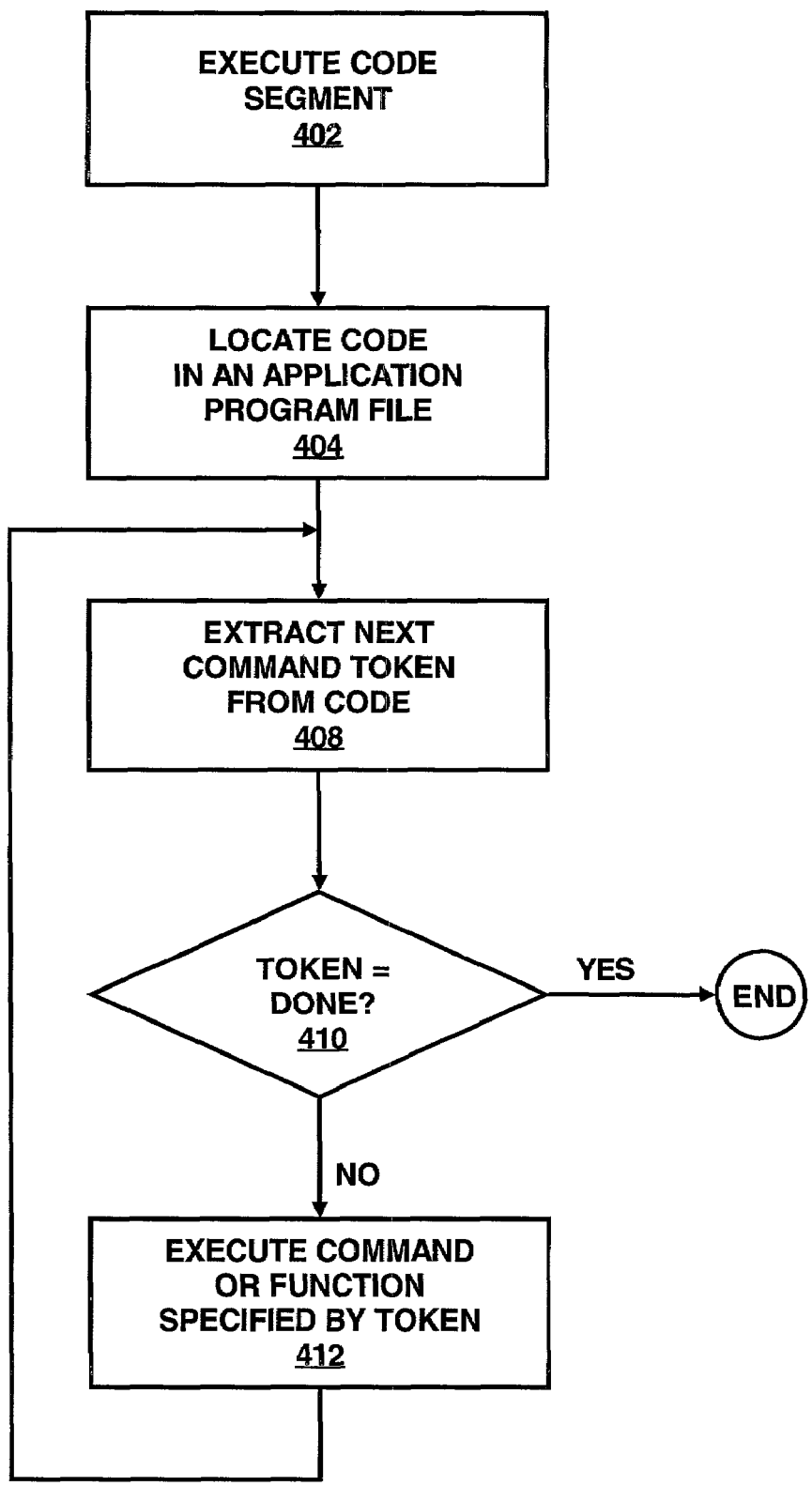
FIG. 4 depicts one example of a process utilizable by the run-time engine of the present invention for executing a particular piece of code.

FIG. 4 illustrates one example of a process utilizable for executing a particular piece of code such as a subroutine or the like. In particular, the process depicted in FIG. 4 exemplifies the execution of any of the validation, special event, start-up, or tap codes discussed above. More specifically, processing commences with an instruction or command to execute a particular piece of code (step 402). In response, run-time engine 102 locates the code in the application program file (step 404) and begins retrieving and executing the instructions or "tokens" (step 408). Processing follows the logic dictated by the code until a done instruction or token is retrieved (step 410). Upon retrieving a done token, processing ends. If the token retrieved is something other than a done instruction, the function or command specified by the token is executed (step 412). This process continues until the code segment completes execution, as determined by the above-mentioned done token.

Figure 5A:
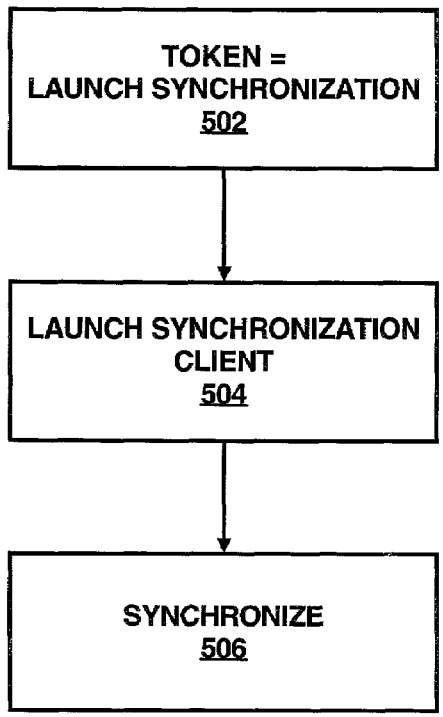
FIG. 5A depicts one example of a process utilizable for implementing a synchronization command for reconciling one or more databases implemented on, for example, the components depicted in FIG. 1A.

Examples of the execution of possible commands or instructions are now described with reference to FIGS. 5A-5B. FIG. 5A illustrates execution of a synchronization command. In this regard, after retrieving and identifying a token as a synchronization command (step 502), the instruction is executed by calling, for example, sync processes 104 and 114 (FIG. 1). In response, sync processes 104 and 114 reconcile and update each of the databases implemented on, for example, PDA 100 and PC 110. Thus, if during the course of execution of a warehouse inventory application a synchronization command is encountered, sync processes 104 and 114 may be called to update or reconcile a central database located on PC 110 to include any data collected by PDA 100 subsequent to execution of the last synchronization process. Furthermore, in wireless environments, synchronization may occur without the user having to leave the warehouse and position PDA 100 into a docking cradle.

In addition to the synchronization command illustrated in FIG. 5a, embodiments of the present invention contemplate utilizing a synchronization command that synchronizes only certain of the databases implemented on PDA 100 and PC 110. Furthermore, other embodiments contemplate synchronization commands that can be used to return or pass control to a particular application after synchronization. These and other features may be implemented utilizing a synchronization command with one or more parameters. More specifically, the parameters included with the synchronization command may be used to indicate the specific databases to be reconciled. Similarly, the parameters may be used to indicate one or more applications to which control is to be passed after synchronization. Referring to FIG. 5b, one example of such a synchronization command with parameters is now described.

Figure 5B:
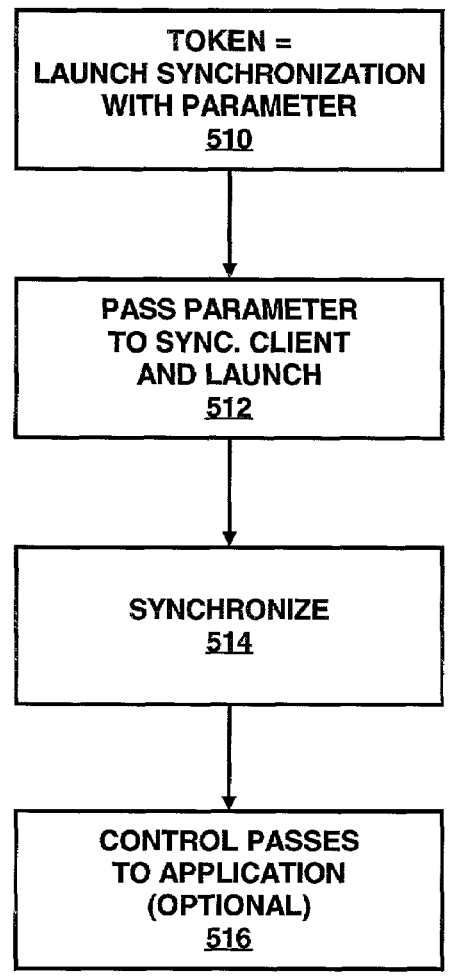
FIG. 5B depicts one example of a process utilizable for implementing a synchronization command with a parameter for reconciling any or all of the databases implemented on, for example, the components depicted in FIG. 1A.

In FIG. 5B, after retrieving a synchronization command and parameter (step 10), synchronization is effected by calling, for example, sync processes 104 and 114. In addition, any parameters included with the command are also passed to sync processes 104 and 114 (step 512). From there, sync processes 104 and 114 reconcile and update each of the databases identified by the parameters included with the synchronization command or instruction (step 514). For example, a parameter may be included that directs sync process 104 and 114 to update only a warehouse inventory application database. In this manner, only certain databases implemented on PDA 100 and PC 110 may be reconciled or synchronized resulting in a substantial time savings. In addition, other parameters may also be included with the synchronization command described above. For instance, a designer may identify an application to which control is to be passed after synchronization. Thus, as an example, during execution of a warehouse inventory application, a synchronization command may include a parameter that indicates that control should be returned to the inventory application after synchronization. Or, in the alternative, control may be passed to an entirely different application. In either of these cases, control may be passed to the point during execution where the synchronization instruction was retrieved, or the application may be executed from its beginning.

Figure 6:
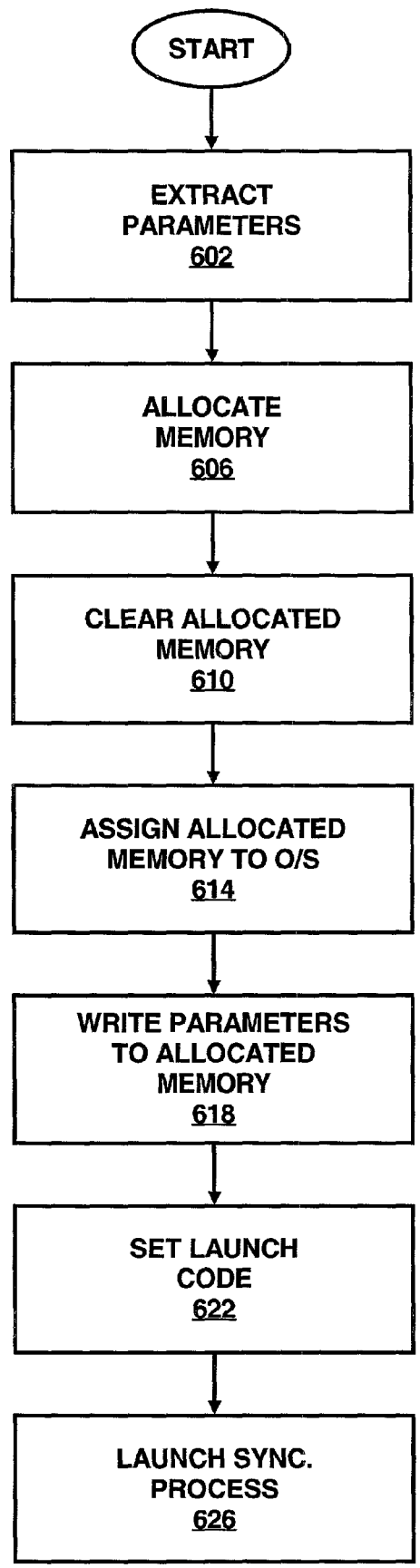
FIG. 6 depicts one example of a process utilizable by the run-time engine of the present invention for launching, for example, the synchronization command of FIGS. 5A or 5B.

Referring to FIG. 6, one example of a process utilizable by run-time engine 102 for implementing the synchronization commands mentioned above is now described. Initially, any parameters retrieved from the application program file may be extracted from the synchronization instruction (step 602). For example, the name of the database(s) to be reconciled and the application that is to receive control after the reconciliation procedure may be obtained. Similarly, a parameter indicating that all of the databases are to be reconciled may also be extracted. Subsequently, memory in the PDA may be allocated for the extracted parameters (step 606). This allocated memory may then be cleared or set to null (step 610) and assigned to, for example, a PDA operating system (step 614). One example of such an operating system includes Palm OS offered by Palm, Inc. of Santa Clara, Calif.

Afterwards, the previously extracted parameters may be written to memory (step 618). Some examples of the parameters that may be written to memory at this time include the names of the databases to be reconciled, an identification number identifying the calling application program, an application that is to receive control after reconciliation, and the like. In addition, a launch code may also be written to memory indicating, for example, that all of the databases are to be reconciled (step 622). Then, sync processes 104 and 114 may be launched (step 626). More specifically, run-time engine 102 instructs, for example, the operating system to call sync processes 104 and 114 and provides the operating system with, for example, the identification number of the calling application program, any launch code, and the memory address containing the stored parameters, and the like. From there, sync processes 104 and 114 synchronize the databases and direct control to an application program as determined by the above-discussed parameters.

In addition to the synchronization commands discussed above, embodiments of the present invention also contemplate executing instructions or commands for performing arithmetic calculations including trigonometric and other mathematical calculations, conditional expressions and conditional branching to particular segments of the application program, drawing on a PDA screen using graphical commands, alteration of the content of displayed screen objects, communicating with other computing devices over serial or TCP/IP connections, locating and calling external callable modules located on PDA 100, and the like. Examples of specific command functions include graphics commands, control and logic statements, arithmetic functions, character functions, Palm OS™ functions, serial port functions, trigonometric functions, screen object properties and methods, date objects properties and methods, string object methods, table object properties and methods, socket connection objects and methods, time object properties and methods, and the like. As an example of the methods and properties provided by one object, the time object allows the setting and retrieval of any of an hour, minute or second from a time value.

Figure 7:
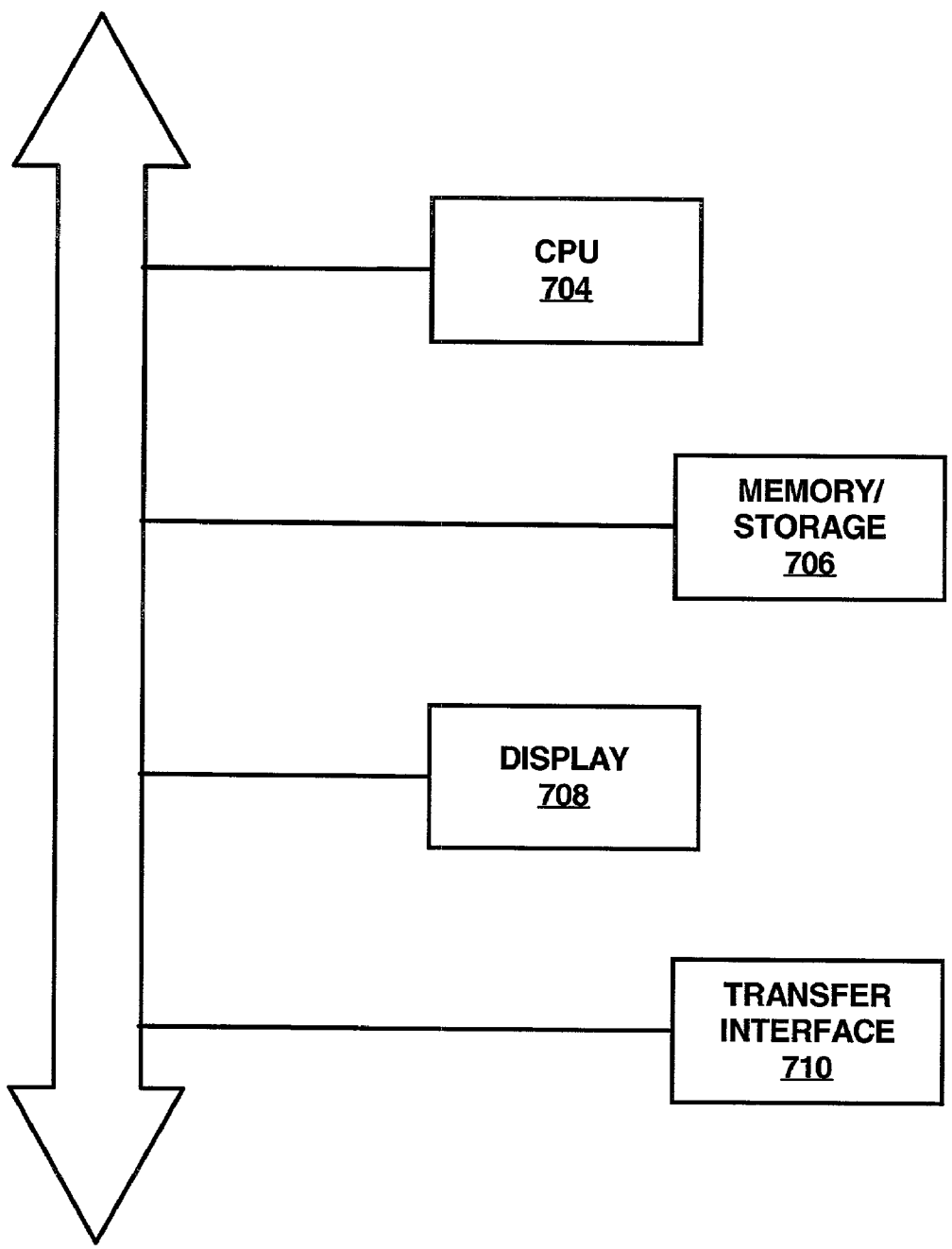
FIG. 7 is a high-level block diagram depicting aspects of computing devices contemplated as part of, and for use with, embodiments of the present invention, such as a central computer and a personal digital assistant.

An example of internal hardware that could be used for the various devices mentioned above (including PDA 100 and PC 110) is now shown with regard to FIG. 7. Referring to FIG. 7, a CPU 704 is in communication with a memory/storage device 706 via bus 702. CPU 704 can be any number of different types of processors, including those manufactured by Intel Corporation or Motorola of Schaumberg, Ill. The memory/storage device 706 can be any number of different types of memory devices such as DRAM and SRAM as well as various types of storage devices, including magnetic and optical media. Furthermore, memory/storage device 706 can also take the form of a transmission.

Embodiments of the present invention contemplate that various portions of software for implementing the various aspects of the present invention as previously described can reside in memory/storage device 706.

A display device 708 is also shown, which could be any number of devices conveying visual and/or audio information to a user. Also in communication with bus 702 is a transfer interface 710 for allowing device 700 to interface with other devices.

In general, it should be emphasized that the various components of embodiments of the present invention can be implemented in hardware, software, or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using C or C++ programming languages.

It is also to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A method of reconciling data between a host device wirelessly connected to a personal data assistant, comprising:
   commencing execution of a first application on said personal data assistant;
   executing a synchronization instruction, said synchronization instruction comprising at least one parameter including a control parameter identifying a different second application to perform a next instruction after executing said synchronization instruction;
   launching a first synchronization process on said personal data assistant in response to said executing said synchronization instruction from said first application on said personal data assistant;
   launching a second synchronization process on said host device in response to said executing said synchronization instruction from said first application on said personal data assistant; and
   synchronizing data, over a data connection, stored in said personal data assistant with data stored in said host device by said first synchronization process and said second synchronization process.

2. The method of claim 1, further comprising:
   establishing a TCP/IP communication link between said host device and said personal data assistant for synchronizing said data.

3. The method of claim 1, wherein:
   said at least one parameter identifies data for synchronization.

4. The method of claim 3, wherein:
   said identified data includes data stored in at least one database in said personal data assistant that is synchronized with data stored in an associated database in said host device.

5. The method of claim 1, wherein said step of executing a synchronization instruction further comprises:
   extracting said at least one parameter from said synchronization instruction; and
   storing said at least one parameter in memory in said personal data assistant.

6. The method of claim 5, wherein said executing a synchronization instruction further comprises:
   retrieving said stored at least one parameter from said memory; and
   executing from said application said synchronization instruction with said retrieved at least one parameter.

7. The method of claim 1, wherein:
   said executing a synchronization instruction from said first application further comprises executing said synchronization instruction in response to an event.

8. The method of claim 7, wherein:
   said event comprises selecting a button or icon displayed by said first application on said personal data assistant.

9. The method of claim 7, wherein:
   said event comprises selecting a menu item displayed by said first application on said personal data assistant.

10. The method of claim 7, wherein:
    said event comprises one of selecting a form and closing a form displayed on said personal data assistant.

11. A system comprising:
a personal data assistant, comprising at least one first database, to execute a first application and a synchronization instruction, and to launch a first synchronization process on said personal data assistant in response said synchronization instruction; and
a host device to connect to said personal data assistant over a data connection, to include at least one second database, and to launch a second synchronization process on said host device in response to said synchronization instruction, with synchronization between said personal data assistant and said host device being performed by said first synchronization process and said second synchronization process;
wherein said synchronization instruction comprises at least one parameter including a control parameter identifying a different second application to perform a next instruction after executing said synchronization instruction.

12. The system of claim 11, wherein said personal data assistant further comprises:
a runtime engine executing said application; and
a memory storing a program file received from said host device, said program file including said synchronization instruction executed by said personal data assistant.

13. The system of claim 12, wherein:
said runtime engine is configured to retrieve said synchronization instruction from said program file and execute said synchronization instruction.

14. The system of claim 13, wherein:
a first synchronization process is launched on said personal data assistant and a second synchronization process is launched on said host device for synchronizing in response to said execution of said synchronization instruction.

15. The system of claim 13, wherein:
said host device further comprises an integrated design environment configured to generate said first application and said program file, said first application and said program file being downloaded to said personal data assistant from said host device through a communication link.

16. A data synchronization system comprising:
a host computer to include an integrated design environment, a first plurality of databases, and at least one first application, wherein said host computer is configured to generate said at least one first application and a first program file including instructions executed with said first application;
a personal data assistant to connect to said host computer through a data connection, said personal data assistant comprising a runtime engine to execute said first application and a second plurality of databases, and to launch a first synchronization process on said personal data assistant in response said synchronization instruction; and
a host device to launch a second synchronization process in response to said first synchronization process, synchronization between said personal data assistant and said host device being performed by said first synchronization process and said second synchronization process;
wherein said personal data assistant is configured to receive said at least one first application and first program file from said host computer, and said runtime engine is configured to initiate said at least one first application and said synchronization instruction in said first program file, said synchronization instruction comprises at least one parameter including a control parameter identifying a different second application to perform a next instruction after executing said synchronization instruction.

17. A method of synchronizing data between a personal data assistant and a remote computer, comprising:
selecting from said personal data assistant which files on said personal data assistant to synchronize with said remote computer;
establishing data communications between said personal data assistant and said remote computer;
running a first application on said personal data assistant, said first application comprising a synchronization instruction comprising at least one parameter including a control parameter identifying a different second application to perform a next instruction after executing said synchronization instruction;
launching a first synchronization process on said personal data assistant in response to said synchronization instruction; and
launching a second synchronization process on said host device in response to said synchronization instruction;
wherein said synchronization between said personal data assistant and said host device being performed by said first synchronization process and said second synchronization process.

18. The method of synchronizing data between a personal data assistant and a remote computer according to claim 17, wherein:
said synchronizing is performed over a wireless connection.

19. The method of synchronizing data between a personal data assistant and a remote computer according to claim 17, wherein:
said synchronizing synchronizes a first database on said personal data assistant with a second database on said remote computer.

20. The method of synchronizing data between a personal data assistant and a remote computer according to claim 17, further comprising:
selecting a button or icon displayed by an application on said personal data assistant.

21. The method of synchronizing data between a personal data assistant and a remote computer according to claim 17, further comprising:
selecting a menu item displayed by an application on said personal data assistant.

* * * * *